United States Patent Office 3,579,318
Patented May 18, 1971

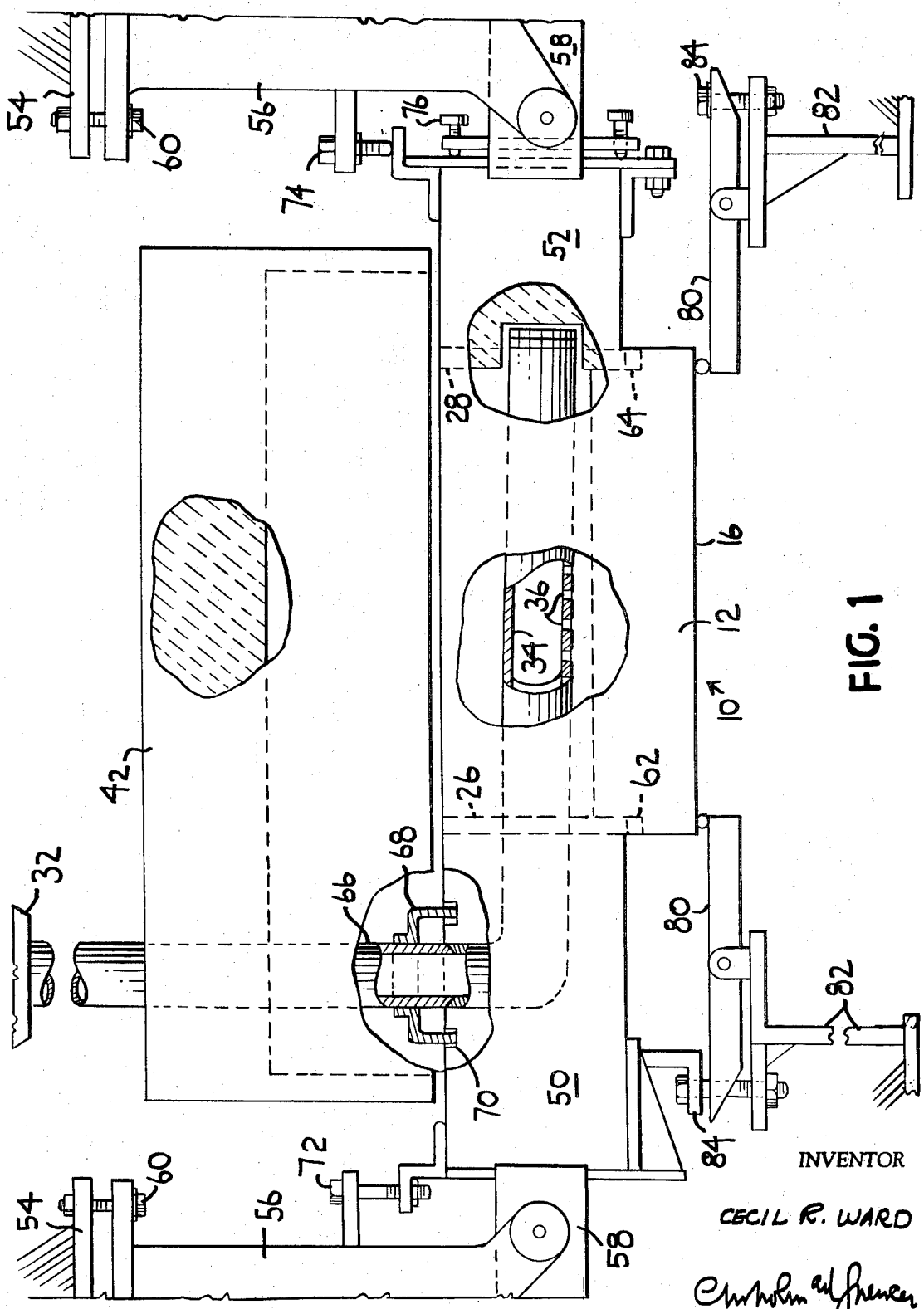

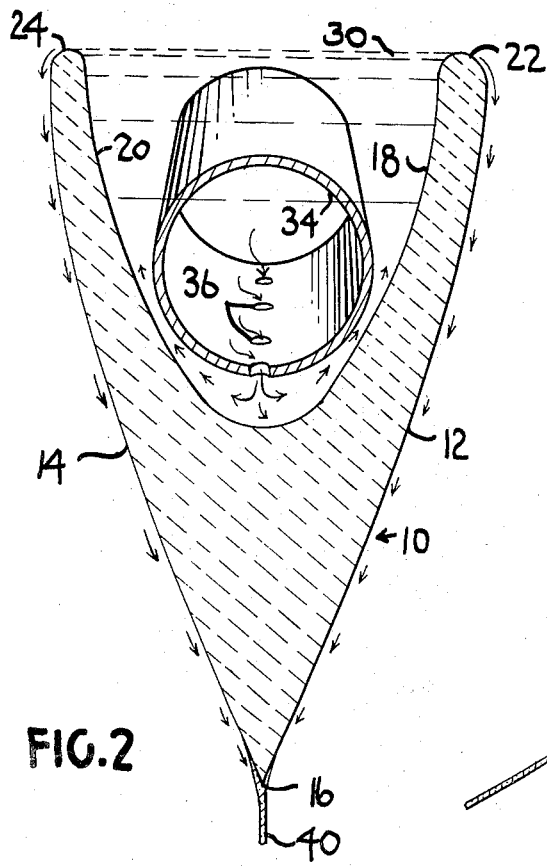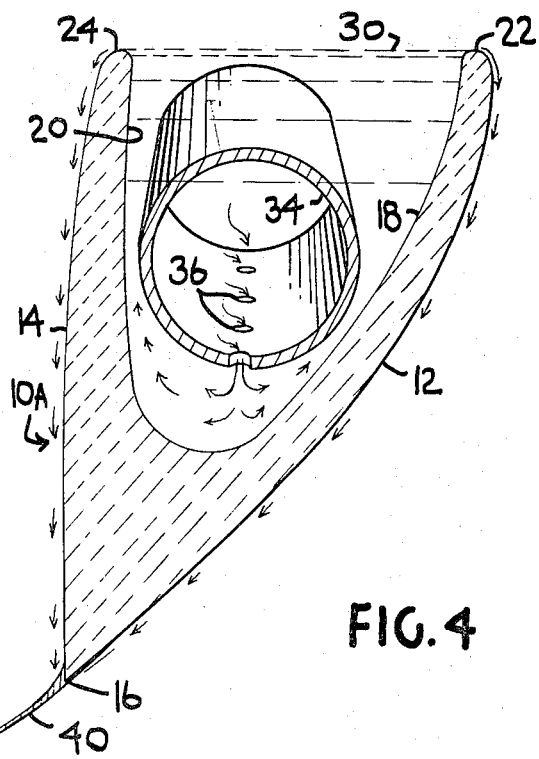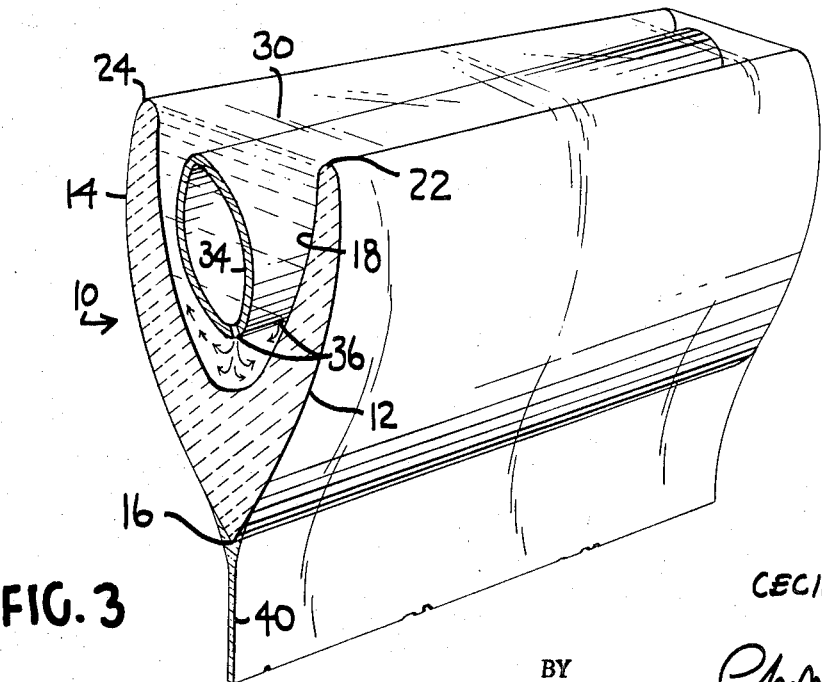

---

3,579,318
METHOD OF AND APPARATUS FOR FORMING GLASS SHEETS BY DRAWING DOWNWARDLY
Cecil R. Ward, Gibsonia, Pa., assignor to
PPG Industries, Inc., Pittsburgh, Pa.
Filed May 2, 1968, Ser. No. 726,020
Int. Cl. C03b 17/00
U.S. Cl. 65—90
4 Claims

ABSTRACT OF THE DISCLOSURE

A sheet of glass is drawn downwardly from a contoured nozzle incorporating a trough into which glass is fed through a pipe or conduit from a melter. The glass is extruded upwardly between the inner walls of the nozzle and the feed conduit fills the nozzle and overflows its edges.

BACKGROUND OF THE INVENTION

There are two basic systems for drawing glass, one an updraw process in which a mass of glass is drawn upwardly against the force of gravity, and the other a downdraw process in which the glass flows downwardly using the gravitational force.

Many attempts have been made to downdraw glass. In what is probably the most successful method, glass is delivered into a trough of a nozzle to form a pool therein and is permitted to flow over the opposed edges of the trough to join at the bottom into a sheet. Examples of the prior art are Allen, U.S. Patent 1,872,550, Dockerty et al., U.S. Patent 3,149,949 and Dockerty, U.S. Pat. 3,338-699.

The Allen and Dockery et al. patents rely upon a head of glass to feed the respective nozzles. The Dockerty patent feeds the nozzle directly from the glass melting tank.

Surging of glass has been experienced in using the Allen concept, so that the glass produced varies in thickness from edge to edge, an undesirable condition.

The Dockery et al. arrangement in which glass passes upwardly through a series of holes or openings in the clay refractory nozzle can produce good quality glass. However, from a study of the glass product the thermal history of the glass can be observed. Lines can be seen which correspond to the openings in the nozzle. Glass which passes through the openings erodes the refractory and the refractory wash becomes incorporated in the glass. A major drawback of the Dockerty et al. process, in addition to that just described, is the problem of thickness control. A set of openings through which glass flows upwardly in the nozzle can be designed for a certain temperature and through-put of glass to produce a product of a given thickness. Changes in temperature and through-put cannot be accommodated with the same openings without causing thickness variations in the ribbon. In other words, there is one set of openings for each glass thickness, each glass temperature and each through-put. Changes cannot be accommodated by one nozzle.

The Dockerty nozzle is constructed according to a mathematical formula to provide a designed flow of glass from one end of the nozzle to the other. While this may produce good results, refractories of the kind of which the nozzle is constructed wear when in contact with molten glass, so that any such arrangement based on a mathematical equation will, with time and wear, change. This is not an ideal constructtion.

SUMMARY OF THE INVENTION

It has been found that the deficiencies of the prior art can be substantially eliminated by use of the features of this invention, below described.

Molten glass from a source is delivered into a nozzle having an elongated trough having inner walls, longitudinal edges in a horizontal plane, and outer walls which terminate at an apex of 90° or less. The nozzle is generally cuneiform in section and made of a clay refractory such as sillimanite or the like, which is compatible with the glass being formed. Molten glass is delivered through a feed conduit, having a plurality of openings therethrough, which conduit is substantially coextensive in length with the trough and constructed and positioned that the glass is extruded between the conduit and the inner walls of the trough. The glass fills the trough, flows over the edges thereof, along the side walls thereof and the streams join at the apex to form glass sheet. Generally the series of openings along the length of the feed conduit are spaced and sized to provide and insure an equal flow of glass into the trough over the length of the edges of the trough. The feed conduit may be adjustably angled with respect to the trough from the glass source to the terminal end thereof to insure the proper flow of glass along the length of the trough and to adjust for temperature and sheet thickness. The openings may be graduated in size from one end of the feed conduit to the other for control purposes. By constructing the conduit to be adjustable, up, down and side-to-side, refractory wear can be accommodated and the proper flow of glass from end-to-end of the trough can be insured. By extruding the glass between the conduit and the inner walls of the trough to constrict the flow of the molten glass along the inner walls, it has been discovered that no thermal history can be detected in the product, even though the glass passes through orifices in the conduit.

The glass after being formed is conveyed by conventional rolls to an annealing lehr for annealing and then can be cut for future use.

THE DRAWINGS

FIG. 1 is a side elevational view, partly in section, of a sheet forming apparatus embodying the invention;

FIG. 2 is a cross-sectional view of a nozzle and feed tube of this invention;

FIG. 3 is a partial perspective view of the nozzle and feed conduit of this invention; and FIG. 4 is a sectional view, similar to FIG. 2 illustrating a modification of the nozzle according to this invention.

THE PREFERRED EMBODIMENT

Referring now to the drawings, a nozzle 10 is provided having two oppositely disposed converging outside walls 12, 14 which terminate and converge at an apex 16. The nozzle 10 has converging inner walls 18, 20 which, with the outside walls 12, 14 define longitudinal edges 22, 24. The inner walls 18, 20 with end walls 26, 28 define a trough 30 into which molten glass is fed from a source 32 (see FIG. 1) to a feed conduit 34. The feed conduit 34 is supported by the end walls 26, 28 so as to be movable and adjustable. The feed conduit 34 is provided with a series of openings 36 through which glass flows into the trough. The glass flows through the openings 36 and is extruded upwardly between the feed conduit 34 and the inner walls 18, 20 of the nozzle. The temperature and rate of feed determine the thickness of the sheet 40 formed at the apex 16, which sheet can then be conveyed from the forming apparatus for use.

The nozzle is suitably supported in a muffle 42, so as to maintain the glass temperatures desired for proper operation.

The feed conduit 34 and the end walls 26, 28 are suitably independently supported for both horizontal and vertical movement by any suitable arrangement, so that the relative position of the inner walls 18, 20 of the nozzle and the feed conduit 34 can be adjusted and/or varied, depending upon various conditions which exist when glass sheet is formed and to change or modify the thickness of the sheet.

As illustrated in FIGS. 1 to 3, the nozzle is symmetrical about a vertical axis and the glass is discharged generally vertically downwardly. The glass can, if temperature and other conditions are favorable, be conveyed away from the forming nozzle in a horizontal plane.

A suitable arrangement for supporting and adjusting the position of the nozzle 10 and feed tube 34 is illustrated in FIG. 1. Refractory end blocks 50, 52 are hung from a support 54 by members 56 pivoted to brackets 58 to which are affixed the end blocks 50, 52, the vertical adjustment and position of which can be varied by bolts 60. The end blocks are received in recesses 62, 64 in the nozzle 10 for sliding movement. The end block 50 supports a tube 66 connected to feed tube 34 at one end and to the source 32 at the other. A circular collar 68 around the tube 66 which fits into a groove 70 in the block 50 permits adjustment of the block 50 and the source 32.

Further and additional adjustment of the positions of the blocks can be accomplished by set-bolts 72, 74, 76 and 78, which are associated with various plates or structural members associated with the blocks 50 and 52, the members 56 and the brackets 60.

The nozzle 10 is supported by lower pivoted members 80 supported by beams 82 such that the position of the nozzle can be adjusted, if necessary. Bolts 84 permit such adjustment by changing the position of the members 80 with respect to the supports 82.

FIG. 4 illustrates a nozzle cross-section in which the nozzle identified as 10A is constructed to discharge the sheet glass angularly to the vertical. All parts of the nozzle 10A are the same.

The cross-section of the feed conduit 34 may be other than circular, if desired. The important feature in the arrangement is the extrusion of glass generally upwardly between the feed conduit and the inner nozzle walls.

Thus, in its broadest method aspect, the instant invention comprises the following steps:

(1) Establishing a pool of molten glass in an elongated zone defined by downwardly converging walls having inner and outer surfaces, the inner surfaces of which meet to provide a bottom of said zone and which extend from said bottom of said zone upwardly to opposite, spaced edges (22, 24) coextensive of said zone, (2) Introducing molten glass at a plurality of points (36) disposed coextensively of said elongated zone and in a path of flow between the inner surfaces of said converging walls and in a path of flow from each said point of introduction which is directed toward said bottom of said zone, (3) Flowing said molten glass upwardly from said bottom of said zone over the inner surfaces of said converging walls of said elongated zone, over each of said spaced edges 22, 24 and downwardly over the outer surfaces of said converging walls until each of said flows of molten glass merge at a point of convergence 16 of the outer surfaces of said converging walls, (4) Constricting the flow of said molten glass over each of said inner surfaces as said molten glass flows upwardly over said inner surfaces of said converging walls, and (5) Removing a sheet 40 of glass at the point of convergence 16 of said elongated zone and moving said sheet 40 along a path below said zone.

In a refinement of the method explained above, there is the features that the distance between at least a portion of said points of introduction of molten glass into said zone and the bottom thereof below said points is varied (e.g., by means of moving tube 66 with respect to collar 68) to change the thickness of said glass sheet.

In its broadest apparatus aspect, the invention may be considered as involving the combination of A source 32 of molten glass, A nozzle 10 having a trough-like inner configuration defined by inner walls which converge to provide a bottom surface and outer walls 12, 14 which terminate at an apex 16, and A pipe 34 connected to said source of glass and extending into said trough for delivering glass from said source to said trough, said pipe having a plurality of openings 36 adjacent to and spaced from said bottom surface for the passage of glass from the source into the trough, Whereby said glass is constricted as it passes between the pipe and the inner walls of the trough to fill said trough, overflow the sides thereof and then flow along the outer walls and joining at the apex to form a glass sheet.

In a refinement of that apparatus, there is used the features that there are provided means (such as 66, 68) to adjust the position of the pipe relative to the inner walls of the trough and vary the distance between said bottom surface and the openings in said pipe to adjust the flow from said trough from end-to-end thereof.

SPECIFIC EXAMPLE

On an experimental scale, a nozzle cast of sillimanite and Monofrax-"M" a high alumina silicate refractory, manufactured by Monofrax Corporation, having an effective internal length of 14½ inches with a feed pipe constructed of platinum and having an internal diameter of 3 inches and openings of ½ x 2⅛ inches spaced ⅛ inch apart was used. The pipe was supported at an angle of 2° with resect to the nozzle. The interior depth of the nozzle was 4¾ inches and its outside depth was 9¾ inches. Molten soda-lime-silica glass was delivered at a rate of 275 pounds per hour to the nozzle through the feed pipe and glass was removed from the bottom or apex of the nozzle as a sheet 0.117 inch in thickness and 8¾ inches wide and at a rate of 46.2 inches per minute. The thickness of the glass sheet produced was substantially uniform for 7 inches of the width and the optical quality of the glass was good.

I claim:

1. A method of forming sheet glass which comprises the steps of
   (1) establishing a pool of molten glass in an elongated zone defined by downwardly converging walls having inner and outer surfaces, the inner surfaces of which meet to provide a bottom of said zone and which extend from said bottom of said zone upwardly to opposite, spaced edges coextensive of said zone,
   (2) introducing molten glass at a plurality of points disposed coextensively of said elongated zone and in a path of flow between the inner surfaces of said converging walls and in a path of flow from each said point of introduction which is directed toward said bottom of said zone,
   (3) flowing said molten glass upwardly from said bottom of said zone over the inner surfaces of said converging walls of said elongated zone, over each of said spaced edges and downwardly over the outer surfaces of said converging walls until each of said flows of molten glass merge at a point of convergence of the outer surfaces of said converging walls,
   (4) constricting the flow of said molten glass over each of said inner surfaces as said molten glass flows upwardly over said inner surfaces of said converging walls, and
   (5) removing a sheet of glass at the point of convergence of said elongated zone and moving said sheet along a path below said zone.

2. The method of claim 1 in which the distance between at least a portion of said points of introduction of molten glass into said zone and the bottom thereof below said points is varied to change the thickness of said glass sheet.

3. Apparatus for drawing glass in a generally downward direction which comprises, a source of molten glass, a nozzle having a trough-like inner configuration defined by inner walls which converge to provide a bottom surface and outer walls which terminate at an apex, and a pipe connected to said source of glass and extending into said trough for delivering glass from said source to said trough, said pipe having a plurality of openings adjacent to and spaced from said bottom surface for the passage of glass from the source into the trough, whereby said glass is constricted as it passes between the pipe and the inner walls of the trough to fill said trough, overflow the sides thereof and then flow along the outer walls and joining at the apex to form a glass sheet.

4. Apparatus for drawing glass in a generally downward direction which comprises, a source of molten glass, a nozzle having a trough-like inner configuration defined by inner walls which converge to provide a bottom surface and outer walls which terminate at an apex, a pipe connected to said source of glass and extending into said trough for delivering glass from said source to said trough, said pipe having a plurality of openings in the lower portion of the pipe adjacent to and spaced from said bottom surface for the passage of glass from the source into the trough, and means to adjust the position of the pipe relative to the inner walls of the trough and vary the distance between said bottom surface and the openings in said pipe to adjust the flow from said trough from end-to-end thereof, whereby said molten glass is constricted as it passes between the pipe and the inner walls of the trough to fill said trough, overflow the sides thereof and then flow along the outer walls and joining at the apex to form a sheet of glass.

References Cited

UNITED STATES PATENTS 3,149,949   9/1964   Dockerty et al. _____ 65—53

ARTHUR D. KELLOGG, Primary Examiner

U.S. Cl. X.R.

65—121, 132, 333